(12) United States Patent
Lacroix et al.

(10) Patent No.: US 10,662,650 B2
(45) Date of Patent: May 26, 2020

(54) T-SLOT EXTRUSION STRUCTURE

(71) Applicant: Vention Inc., Montreal (CA)

(72) Inventors: Etienne Lacroix, Montreal (CA); Samuel Turcotte Estrada, Valleyfield (CA); Maxime Lavigueur, Montreal (CA)

(73) Assignee: Vention Inc., Montreal, Quebec (CA)

( * ) Notice: Subject to any disclaimer, the term of this patent is extended or adjusted under 35 U.S.C. 154(b) by 220 days.

(21) Appl. No.: 15/798,862

(22) Filed: Oct. 31, 2017

(65) Prior Publication Data
US 2019/0127978 A1    May 2, 2019

(51) Int. Cl.
| | |
|---|---|
| *E04C 3/08* | (2006.01) |
| *E04C 3/06* | (2006.01) |
| *E04C 3/04* | (2006.01) |
| *B21C 23/14* | (2006.01) |
| *F16B 7/04* | (2006.01) |

(52) U.S. Cl.
CPC .............. *E04C 3/06* (2013.01); *B21C 23/142* (2013.01); *E04C 3/08* (2013.01); *E04C 2003/0408* (2013.01); *E04C 2003/0421* (2013.01); *E04C 2003/0439* (2013.01); *E04C 2003/0478* (2013.01); *F16B 7/04* (2013.01)

(58) Field of Classification Search
CPC . E04C 3/08; E04C 2003/0408; B21C 23/142; F16B 7/04
See application file for complete search history.

(56) References Cited

U.S. PATENT DOCUMENTS

| | | | | |
|---|---|---|---|---|
| 3,371,454 A | * | 3/1968 | Anderson | E04B 2/766 52/126.4 |
| 3,513,606 A | * | 5/1970 | Jones | A47B 47/0016 52/27 |
| 3,612,585 A | * | 10/1971 | Mayr | A47B 96/145 403/264 |

(Continued)

FOREIGN PATENT DOCUMENTS

| | | |
|---|---|---|
| EP | 1593861 B1 | 4/2007 |
| EP | 1251478 B1 | 4/2010 |
| EP | 1552898 B1 | 10/2012 |

OTHER PUBLICATIONS

Extended European Search Report; European Patent Office; European Application No. 18203719.2; dated Mar. 6, 2019; 7 pages.

*Primary Examiner* — Adam Krupicka
(74) *Attorney, Agent, or Firm* — Taft Stettinius & Hollister LLP

(57) ABSTRACT

An extrusion structure including a central body extending along a longitudinal axis; a first arm body secured to the central body and extending along the longitudinal axis; a second arm body secured to the central body and extending along the longitudinal axis; a first head body secured to the first arm body and extending along the longitudinal axis; and a second head body secured to the second arm body along the longitudinal axis; and wherein the first and second head bodies projecting one towards the other and being spaced apart by a gap, the first head body having a first internal face facing the central body, the second head body having a second internal face facing the central body, and the first and second internal faces being either straight and coplanar or inwardly inclined towards the central body.

25 Claims, 13 Drawing Sheets

(56) References Cited

U.S. PATENT DOCUMENTS

| | | | | |
|---|---|---|---|---|
| 3,901,612 A * | 8/1975 | Canin | F16B 7/187 | 403/189 |
| 4,026,084 A * | 5/1977 | Goose | B62D 33/044 | 52/780 |
| 4,065,904 A * | 1/1978 | Taylor | A47B 96/1458 | 211/193 |
| 4,168,922 A * | 9/1979 | Worrallo | F16B 12/44 | 403/231 |
| 4,226,394 A * | 10/1980 | Einhorn | A47J 47/16 | 24/716 |
| 4,345,849 A * | 8/1982 | Stenemann | F16B 7/046 | 403/252 |
| 4,485,597 A * | 12/1984 | Worrallo | F16B 7/0473 | 52/479 |
| 4,490,064 A * | 12/1984 | Ducharme | A47B 47/0008 | 403/255 |
| 4,652,170 A * | 3/1987 | Lew | E04B 1/617 | 403/381 |
| 4,947,907 A * | 8/1990 | Anselm | B23Q 11/0035 | 142/22 |
| 5,265,972 A * | 11/1993 | Bahr | F16B 7/187 | 403/252 |
| 5,429,438 A | 7/1995 | Wood | | |
| 5,634,300 A * | 6/1997 | Huebner | E04B 2/7407 | 52/281 |
| 5,690,239 A * | 11/1997 | Ballard | A47F 5/04 | 211/187 |
| 5,746,535 A * | 5/1998 | Kohler | A47B 47/0041 | 403/258 |
| 5,779,407 A * | 7/1998 | Tucker | B23Q 3/002 | 144/252.1 |
| 5,785,359 A * | 7/1998 | Nagai | B23Q 3/102 | 285/191 |
| 6,082,837 A * | 7/2000 | Battochio | G09F 15/0068 | 312/140 |
| 6,331,092 B1 * | 12/2001 | Linger | E04B 2/761 | 403/367 |
| 6,478,501 B1 * | 11/2002 | Kahl | F16B 7/0453 | 403/255 |
| 6,481,177 B1 | 11/2002 | Wood | | |
| 6,485,178 B1 * | 11/2002 | Koban | B23Q 1/58 | 384/39 |
| 6,493,995 B2 * | 12/2002 | McKenzie | A47F 5/105 | 52/220.7 |
| 6,615,556 B2 * | 9/2003 | Cates | E04B 2/7457 | 49/504 |
| 7,004,667 B2 | 2/2006 | Ludwig et al. | | |
| 7,073,943 B2 * | 7/2006 | Schmalzhofer | B23Q 1/58 | 384/35 |
| 8,100,600 B2 | 1/2012 | Blum | | |
| 8,209,917 B1 * | 7/2012 | DeZaio | E04C 2/384 | 52/79.5 |
| D676,576 S * | 2/2013 | Oetlinger | E04C 2/384 | D25/121 |
| D708,353 S * | 7/2014 | Oetlinger | | D25/121 |
| 9,004,715 B1 * | 4/2015 | Litke | F21V 21/35 | 362/217.15 |
| 9,115,741 B2 * | 8/2015 | Oetlinger | E05D 5/0238 | |
| 9,200,443 B2 * | 12/2015 | Marple | E04B 2/60 | |
| 9,212,675 B2 | 12/2015 | Oetlinger | | |
| D755,994 S * | 5/2016 | Oetlinger | | D25/121 |
| 2002/0122691 A1 * | 9/2002 | Wood | F16B 5/0685 | 403/381 |
| 2006/0078371 A1 * | 4/2006 | Holscher | F16B 7/187 | 403/264 |
| 2006/0110215 A1 * | 5/2006 | Holscher | F16B 7/187 | 403/253 |
| 2008/0222990 A1 * | 9/2008 | Winkler | A47B 43/003 | 52/655.1 |
| 2010/0226711 A1 * | 9/2010 | Holscher | F16B 7/187 | 403/264 |
| 2011/0176860 A1 * | 7/2011 | Lin | F16B 7/025 | 403/119 |
| 2014/0376997 A1 * | 12/2014 | Dietrich | F16B 7/00 | 403/280 |
| 2017/0030391 A1 * | 2/2017 | Klein | F16B 12/14 | |

* cited by examiner

T-SLOT EXTRUSION STRUCTURE

TECHNICAL FIELD

The present invention relates to the field of extrusion structures, and more particularly to T-slot extrusion structures.

BACKGROUND

T-slot aluminum extrusions are used for various applications, ranging from test rig, to assembly jig, to machine frame. However, despite their potential, they have achieved limited market traction. In fact, much industrial equipment still relies on welded steel structures, which have long lead-time and are costly to design and manufacture. Suboptimal performance in term of assembly tolerance, admissible load, and structural rigidity represent one of the main technology impediment to a wider adoption of T-slot aluminum extrusions for industrial applications.

Since they were introduced in the industry, aluminum extrusions have used assembly plates combined to T-nuts and bolts to create complete assembled frames. Unfortunately, gain in assembly speed of such concept is done at the expense of assembly tolerances. In at least some of the commercially available extrusion systems, T-slot bolts are acting as the assembly plate locating device and holding device. "Normal or close fit" on assembly plate holes and T-slot groove of the extrusion enables assembly plates to be tighten in off position, thereby propagating angular error throughout the assembled structure. The resulting assembled frame typically has poor perpendicularity and parallelism.

In addition, T-slot aluminum extrusion systems are non-linear systems when subject to heavy load (i.e., as opposed to welded structure assemblies, having a wider range of linear properties). Intermittent slippage of T-nuts inside a T-slot groove when submitted to heavy-load, is one of the primary contributor to non-linearity. Non-linearity of T-slot extrusion system makes it complex to predict structural deformation and failure. Trying to correct T-nuts slippage and non-linearity by simply increasing torque in the T-nuts bolt could leads to other issues such as each side of the T-slot groove separating under plastic deformation. This "pull out" phenomenon makes the damaged extrusion unusable.

Therefore, there is a need for an improved extrusion structure that overcomes at least some of the above-identified limitations of the prior art.

SUMMARY

According to a first broad aspect, there is provided an extrusion structure comprising: a central body extending along a longitudinal axis; a first arm body secured to the central body and extending along the longitudinal axis; a second arm body secured to the central body and extending along the longitudinal axis; a first head body secured to the first arm body and extending along the longitudinal axis; and a second head body secured to the second arm body along the longitudinal axis; the first and second head bodies projecting one towards the other and being spaced apart by a gap, the first head body comprising a first internal face facing the central body and a first external face opposite to the first internal face, the second head body comprising a second internal face facing the central body and a second external face opposite to the second internal face, the first external face comprising a first planar face section extending towards the second head body, a first slopping face section extending from the first planar face section towards the central body and a first protruding face section extending from the first slopping face section, the second external face comprising a second planar face section extending towards the first head body, a second slopping face section extending from the second planar face section towards the central body and a second protruding face section extending from the first slopping face section.

In one embodiment, the first and second planar face sections are coplanar.

In one embodiment, the first and second internal faces are coplanar.

In one embodiment, the first and second internal faces are parallel to the first and second external faces.

In one embodiment, the first and second internal faces are each slopped, a distance between the first internal face and a first external plane in which the first straight face sections extends decreasing from the first arm body towards the second arm body and a distance between the second internal face and a second external plane in which the second straight face section extends decreasing from the second arm body towards the first arm body.

In one embodiment, a first angle between the first internal face and the first external plane is comprised between about 3 degrees and about 7 degrees and wherein a second angle between the second internal face and the second external plane is comprised between about 3 degrees and about 7 degrees In one embodiment, a V-groove angle defined between the first and second slopping face sections is comprised between about 30 degrees and about 85 degrees.

In one embodiment, the first and second protruding face sections are coplanar.

In one embodiment, the first and second protruding face sections are parallel to first and second first and second planar face sections.

In one embodiment, a distance between the first and second arm bodies increases from the central body towards the first and second head bodies.

In one embodiment, the central body comprises an outer face facing the gap, the outer face comprising a recess extending along the longitudinal axis and being centered on the gap.

In one embodiment, the central body comprises a central aperture extending along the longitudinal axis and the first and second head bodies each comprise a hole extending along the longitudinal axis.

In one embodiment, the central body, the first arm body, the second arm body, the first head body and the second head body are integral and made of aluminum.

According to another broad aspect, there is provided an extrusion structure comprising: a central body extending along a longitudinal axis between a first end and a second end; a first arm body secured to the central body and extending along the longitudinal axis a second arm body secured to the central body and extending along the longitudinal axis; a first head body secured to the first arm body and extending along the longitudinal axis; and a second head body secured to the second arm body along the longitudinal axis, the first and second head bodies projecting one towards the other and being spaced apart by a gap, the first head body comprising a first internal face facing the central body and a first external face opposite to the first internal face, the second head body comprising a second internal face facing the central body and a second external face opposite to the second internal face, the first external face comprising at least a first planar face section, the second external face comprising at least a second planar face section, the first and second internal faces each being slopped, a distance between the first internal face and a first external plane in which the first planar face section extends decreasing from the first arm body towards the second arm body, and a distance between the second internal face and a second external plane in which the second planar face section extends decreasing from the second arm body towards the first arm body.

In one embodiment, the first and second planar face sections are coplanar.

In one embodiment, an angle between the first internal face and the external plane is comprised between about 3 degrees and about 7 degrees.

In one embodiment, the first external face further comprises a first slopping face section extending from the first planar face section towards the central body, and the second external face further comprises a second slopping face section extending from the second planar face section towards the central body.

In one embodiment, a V-groove angle defined between the first and second slopping face sections is comprised between about 30 degrees and about 85 degrees.

In one embodiment, the first external face further comprises a first protruding face section extending from the first slopping face section and the second external face further comprises a second protruding face section extending from the first slopping face section.

In one embodiment, the first and second protruding face sections are coplanar.

In one embodiment, the first and second protruding face sections are parallel to the first and second first and second planar face sections.

In one embodiment, a distance between the first and second arm bodies increases from the central body towards the first and second head bodies.

In one embodiment, the central body comprises an outer face facing the gap, the outer face comprising a recess extending along the longitudinal axis and being centered on the gap.

In one embodiment, the central body comprises a central aperture extending along the longitudinal axis and the first and second head bodies each comprise a hole extending along the longitudinal axis.

In one embodiment, the central body, the first arm body, the second arm body, the first head body and the second head body are integral and made of aluminum.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
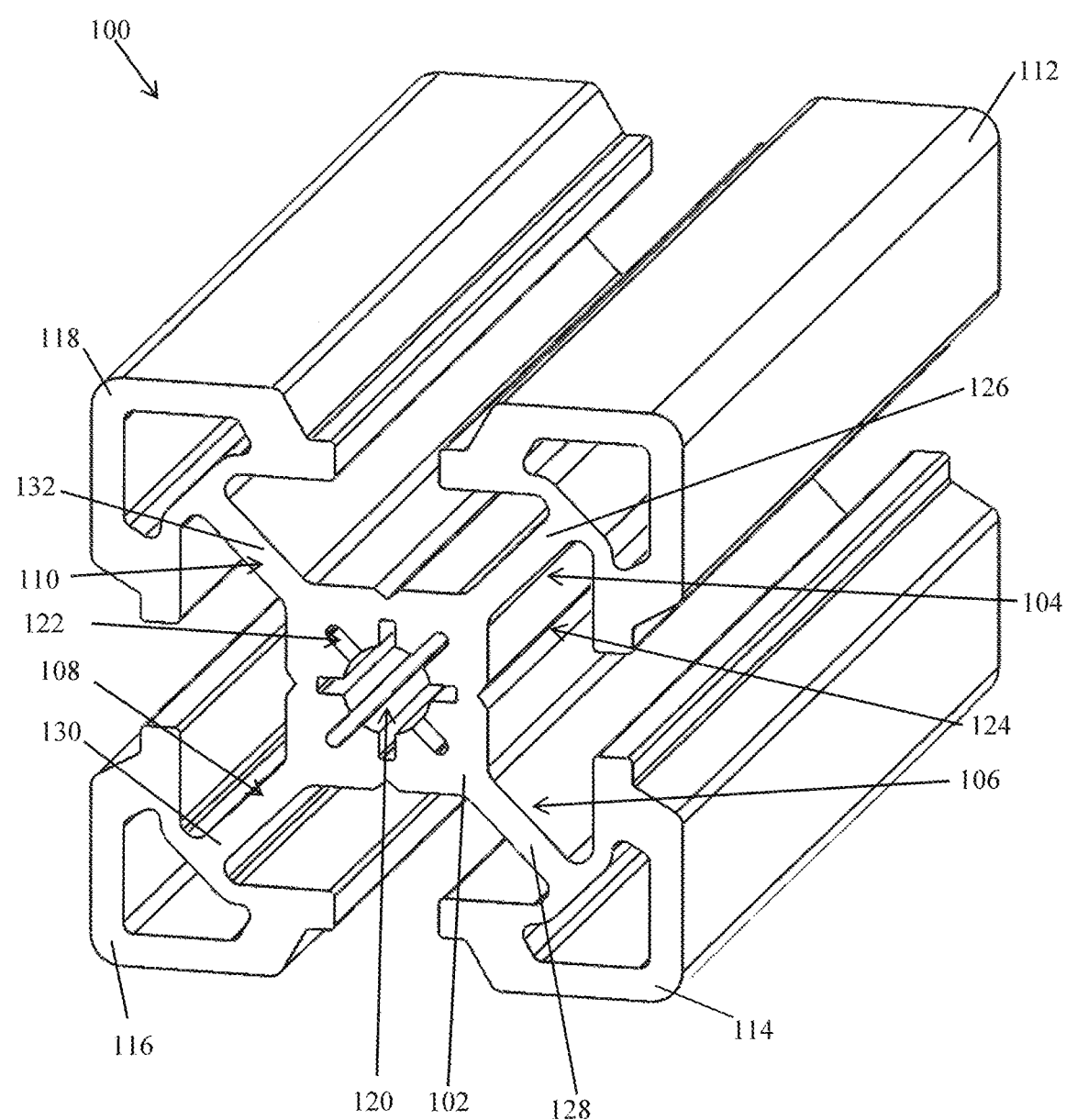
FIG. 1 is a perspective view of an extrusion structure or device comprising a central body, four arm bodies extending from the central body and four head bodies each connected to a respective arm body, adjacent head bodies facing each other comprising coplanar straight internal faces, in accordance with an embodiment.
Figure 2:
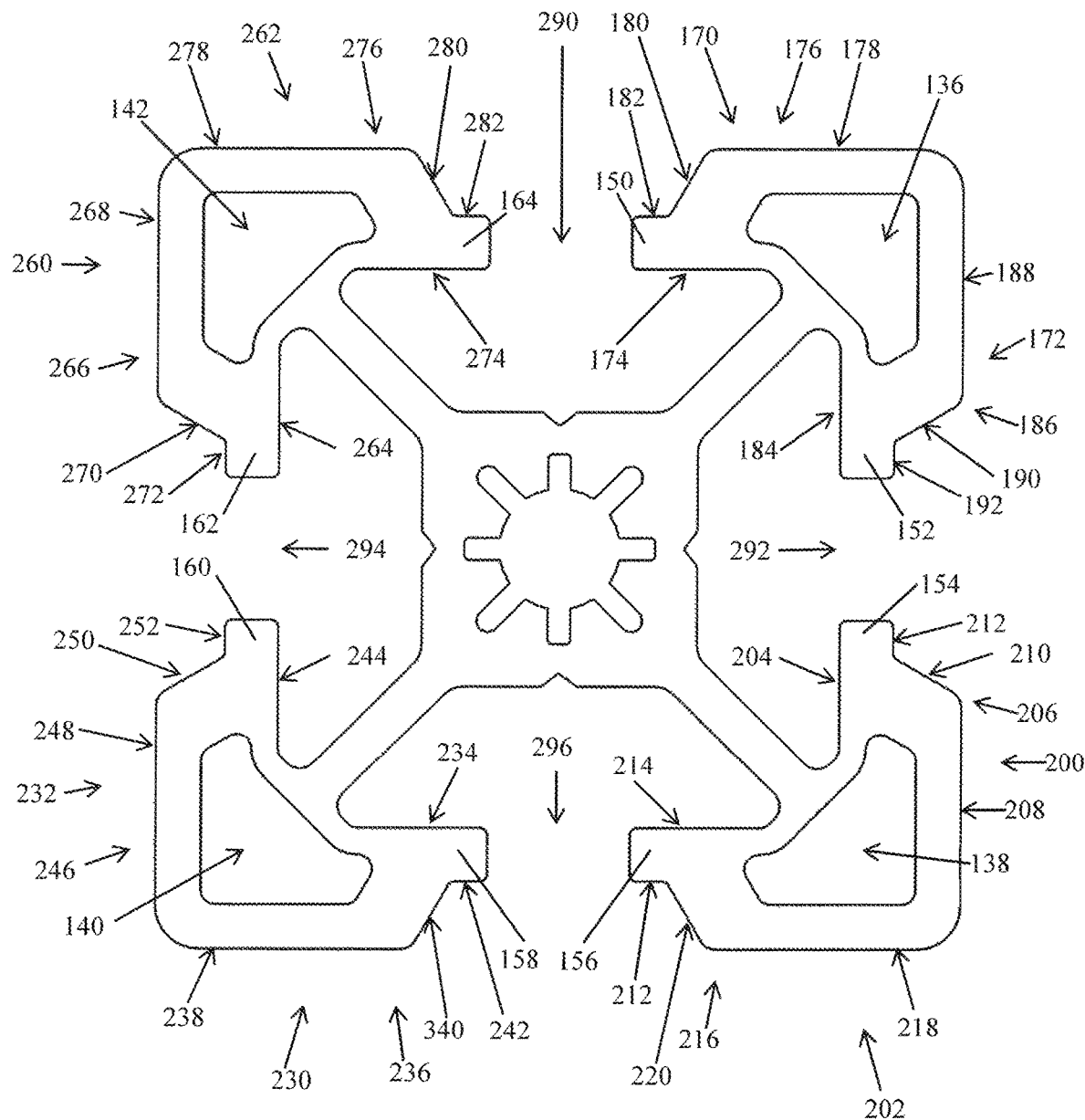
FIG. 2 is a front view of the extrusion structure of FIG. 1.

FIGS. 1 and 2 illustrate a first embodiment of an extrusion structure 100. The structure 100 extends linearly along a longitudinal axis and is provided with a substantially square cross-section.

The extrusion structure 100 comprises a central body 102, four arm bodies 104, 106, 108 and 110 which are each secured to the central body 102, and four head bodies 112, 114, 116 and 118 which are secured to the arm body 104, 106, 108, 110, respectively.

The central body 102 extends along the longitudinal axis and has a substantially square cross-section. The central body 102 is provided with a central cylindrical aperture 120 which is defined by an internal cylindrical wall of the central body 102 and extends along the longitudinal axis between the two ends of the central body 102. The central body 102 is further provided with eight internal grooves 122 which each extend from the internal cylindrical wall of the central body 102 and emerge within the central aperture 120. The internal grooves 122 each extend longitudinally between the two ends of the central body 102. In the illustrated embodiment, the internal grooves 122 are evenly distributed around the circumference of the internal cylindrical wall.

The central body 102 is further provided with four external v-shaped grooves 124 which each extend longitudinally between the two longitudinal ends of the central body 102 along the longitudinal axis thereof. Each external groove 124 is positioned at the center of a respective face of the central body 102.

Each arm body, 104, 106, 108, 110 comprises a plate 126, 128, 130, 132, respectively, having a first end secured to a respective corner of the central body 102 and a second opposite end secured to a respective head body 112, 114, 116, 118. The angle between two adjacent plates 126, 128, 130 and 132 is substantially equal to 90 degrees. However, the person skilled in the art will understand that other configurations may be possible.

Each head body 112, 114, 116, 118 has a substantially triangular cross-sectional shape and is provided with a respective triangular shaped aperture 136, 138, 140, 142 which extends along the longitudinal axis. The plate 126, 128, 130, 132 is secured to the base of the triangle of a respective head body 112, 114, 116, 118 and the triangle of each head body 112, 114, 116, 118 is provided with two protrusions 150 and 152, 154 and 156, 158 and 160, 162 and 164, respectively. Each protrusion 150-164 extends towards an adjacent head body 112, 114, 116, 118.

Each head body 112, 114, 116, 118 may be seen as comprising two head portions secured together, each head portion being provided with a respective protrusion 150-164. For each head body 112, 114, 116, 118, the two head portions form the respective triangle provided with the two protrusions 150 and 152, 154 and 156, 158 and 160, 162 and 164, respectively. Each head portion of a given head body 112, 114, 116, 118 has the shape of a half triangle provided with a protrusion 150-164 and extends towards the head portion of an adjacent head body 112, 114, 116, 118.

The head body 112 comprises a first head portion 170 provided with the protrusion 150 and a second head portion 172 provided with the protrusion 152. The first head portion 170 comprises a straight internal face 174 that faces the internal body 102 and the plate 126 and an external face 176 that is opposite to the internal face 174. The external face 176 comprises three sections: a planar face section 178, a sloped or inclined face section 180 and a protrusion face section 182 which belongs to the protrusion 150. The slopped face section 180 is inclined inwardly, i.e. the distance between the external face 176 and the internal face 174 decreases from the planar face section 178 towards the protrusion face section 182.

The second head portion 172 comprises a straight internal face 184 that faces the internal body 102 and the plate 126 and an external face 186 that is opposite to the internal face 184. The external face 186 comprises three sections: a planar face section 188, a sloped or inclined face section 190 and a protrusion face section 192 which belongs to the protrusion 152. The slopped face section 190 is inclined inwardly, i.e. the distance between the external face 186 and the internal face 184 decreases from the planar face section 188 towards the protrusion face section 192.

The head body 114 comprises a first head portion 200 provided with the protrusion 154 and a second head portion 202 provided with the protrusion 156. The first head portion 200 comprises a straight internal face 204 that faces the internal body 102 and the plate 128, and an external face 206 that is opposite to the internal face 204. The external face 206 comprises three sections: a planar face section 208, a sloped or inclined face section 210 and a protrusion face section 212 which belongs to the protrusion 154. The slopped face section 210 is inclined inwardly, i.e. the distance between the external face 206 and the internal face 204 decreases from the planar face section 208 towards the protrusion face section 212.

The second head portion 202 comprises a straight internal face 214 that faces the internal body 102 and the plate 128 and an external face 216 that is opposite to the internal face 214. The external face 216 comprises three sections: a planar face section 218, a sloped or inclined face section 220 and a protrusion face section 222 which belongs to the protrusion 156. The slopped face section 220 is inclined inwardly, i.e. the distance between the external face 216 and the internal face 214 decreases from the planar face section 218 towards the protrusion face section 222.

The head body 116 comprises a first head portion 230 provided with the protrusion 158 and a second head portion 232 provided with the protrusion 160. The first head portion 230 comprises a straight internal face 234 that faces the internal body 102 and the plate 130, and an external face 236 that is opposite to the internal face 234. The external face 236 comprises three sections: a planar face section 238, a sloped or inclined face section 240 and a protrusion face section 242 which belongs to the protrusion 158. The slopped face section 240 is inclined inwardly, i.e. the distance between the external face 236 and the internal face 234 decreases from the planar face section 238 towards the protrusion face section 242.

The head portion 232 comprises a straight internal face 244 that faces the internal body 102 and the plate 130 and an external face 246 that is opposite to the internal face 244. The external face 246 comprises three sections: a planar face section 248, a sloped or inclined face section 250 and a protrusion face section 252 which belongs to the protrusion 160. The slopped face section 250 is inclined inwardly, i.e. the distance between the external face 246 and the internal face 244 decreases from the planar face section 248 towards the protrusion face section 252.

The head body 118 comprises a first head portion 260 provided with the protrusion 162 and a second head portion 262 provided with the protrusion 164. The first head portion 260 comprises a straight internal face 264 that faces the internal body 102 and the plate 132, and an external face 266 that is opposite to the internal face 264. The external face 266 comprises three sections: a planar face section 268, a sloped or inclined face section 270 and a protrusion face section 272 which belongs to the protrusion 162. The slopped face section 270 is inclined inwardly, i.e. the distance between the external face 266 and the internal face 264 decreases from the planar face section 268 towards the protrusion face section 272.

The second head portion 262 comprises a straight internal face 274 that faces the internal body 102 and the plate 132 and an external face 276 that is opposite to the internal face 274. The external face 276 comprises three sections: a planar face section 278, a sloped or inclined face section 280 and a protrusion face section 282 which belongs to the protrusion 164. The slopped face section 280 is inclined inwardly, i.e. the distance between the external face 276 and the internal face 274 decreases from the planar face section 278 towards the protrusion face section 282.

In the illustrated embodiment, the internal faces of separate but adjacent head portions are coplanar. For example, the head portion 170 of the head body 112 and the head portion 262 of the head body 118 are adjacent but separate, i.e. they belong to different head bodies. The internal face 174 of the head portion 170 and the internal face 274 of the head portion 262 are coplanar. Similarly, the internal faces 184 and 204 are coplanar, the internal faces 214 and 234 are coplanar and the internal faces 244 and 264 are coplanar.

The planar face sections of the external faces of separate but adjacent head portions are also coplanar. For example, the planar face section 178 of the head portion 170 of the head body 112 and the planar face section 278 of the head portion 262 of the head body 118 are coplanar. Similarly, the planar face section 188 and the planar face section 208 are coplanar, the planar face section 218 and the planar face section 238 are coplanar, and the planar face section 248 and the planar face section 268 are coplanar.

In the illustrated embodiment, the internal face and the planar face of a same head portion are parallel. For example, the internal face 174 and the planar face section 178 of the head portion 170 are parallel together. The internal face 274 and the planar face section 278 of the head portion 262 are parallel. Since the internal faces 174 and 274 are coplanar and the planar face sections 178 and 278 are coplanar, the internal faces 174 and 274 are parallel to the planar face sections 178 and 278.

The internal face 184 and the planar face section 188 of the head portion 172 are parallel together. The internal face 204 and the planar face section 208 of the head portion 200 are parallel. Since the internal faces 184 and 204 are coplanar and the planar face sections 188 and 208 are coplanar, the internal faces 184 and 204 are parallel to the planar face sections 188 and 208.

The internal face 214 and the planar face section 218 of the head portion 202 are parallel together. The internal face 234 and the planar face section 238 of the head portion 230 are parallel. Since the internal faces 214 and 234 are coplanar and the planar face sections 218 and 238 are coplanar, the internal faces 214 and 234 are parallel to the planar face sections 218 and 238.

The internal face 244 and the planar face section 248 of the head portion 232 are parallel together. The internal face 264 and the planar face section 268 of the head portion 260 are parallel. Since the internal faces 244 and 264 are coplanar and the planar face sections 248 and 268 are coplanar, the internal faces 244 and 264 are parallel to the planar face sections 248 and 268.

Furthermore, the planar face sections of a same head body are substantially orthogonal to one another and the internal faces of a same head body are substantially orthogonal to one another. For example, the planar face sections 178 and 188 of the head body 112 are substantially orthogonal to one another and the internal faces 174 and 184 of the head body 112 are also substantially orthogonal to one another. The planar face sections 208 and 218 of the head body 114 are substantially orthogonal to one another and the internal faces 204 and 214 of the head body 114 are also substantially orthogonal to one another. The planar face sections 238 and 248 of the head body 116 are substantially orthogonal to one another and the internal faces 234 and 244 of the head body 116 are also substantially orthogonal to one another. The planar face sections 268 and 278 of the head body 118 are substantially orthogonal to one another and the internal faces 264 and 274 of the head body 118 are also substantially orthogonal to one another.

In the illustrated embodiment, two adjacent protrusions are spaced by a gap having a given width. The space defined between the central body, the internal faces and the protrusions of two adjacent head bodies and the two arms to which the two adjacent head bodies are secured define a T-shaped groove or T-slot. As described below, each T-shaped groove is adapted to receive therein a T-nut for assembling two extrusion structures together for example.

For example, a first gap is present between the protrusions 150 and 164 and a T-shaped groove 290 is formed by the space between the central body 102, the protrusions 150 and 164 and the internal faces 174 and 274. A second gap is also present between the protrusions 152 and 154 and a T-shaped groove 292 is formed by the space between the central body 102, the protrusions 152 and 154 and the internal faces 184 and 204. A third gap is further present between the protrusions 156 and 158 and a T-shaped groove 294 is formed by the space between the central body 102, the protrusions 156 and 158 and the internal faces 214 and 234. Finally, a fourth gap is further present between the protrusions 160 and 162 and a T-shaped groove 296 is formed by the space between the central body 102, the protrusions 160 and 162 and the internal faces 244 and 264.

The space extending between two adjacent sloped face sections and between two protrusion face sections define a V-shaped groove which is adapted to receive therein a protrusion of a connecting plate as described below. In the illustrated embodiment, the angle between two adjacent sloped face sections 180 and 280, 190 and 210, 220 and 240, and 250 and 270 is substantially equal to about 60 degrees. However, the person skilled in the art will understand that other angle values may be used. For example, the angle between two adjacent sloped face sections 180 and 280, 190 and 210, 220 and 240, and 250 and 270 could be comprised between about 30 degrees and about 85 degrees°

It should be understood that the extrusion structure 100 may be modified as long as the extrusion structure 100 comprises a central body, at least two adjacent arm bodies and at least two adjacent head portions each supported by a respective arm body and spaced apart by a gap and as long as the two head portions are each provided with a respective sloped face section and a respective protrusion so that at least one T-shaped groove and at least one V-shaped groove be defined between the central body, the two adjacent arm bodies and the two adjacent head portions.

For example, an extrusion structure may only comprise a central body, two spaced apart arm bodies projecting from the central body and a two head bodies secured to a respective head body and each head body comprises a single head portion so that the two head portion face each other and are spaced apart by a gap. Each head portion is provided with an internal face that faces the central body and an opposite external face which comprises a planar face section, a slopped face section and a protrusion face section. The extrusion structure then comprises a single T-shaped groove and a single V-shaped groove.

It should be understood that the shape, number, dimensions and/or position of the aperture 120, 136, 138, 140 and/or 142 and/or the grooves 122 and/or 124 may vary. Alternatively, the aperture 120, 136, 138, 140 and/or 142 and/or the grooves 122 and/or 124 may be omitted. It should also be understood that additional aperture(s) and/or additional groove(s) may be present on the central body, the arm bodies and/or the head bodies.

Figure 3:
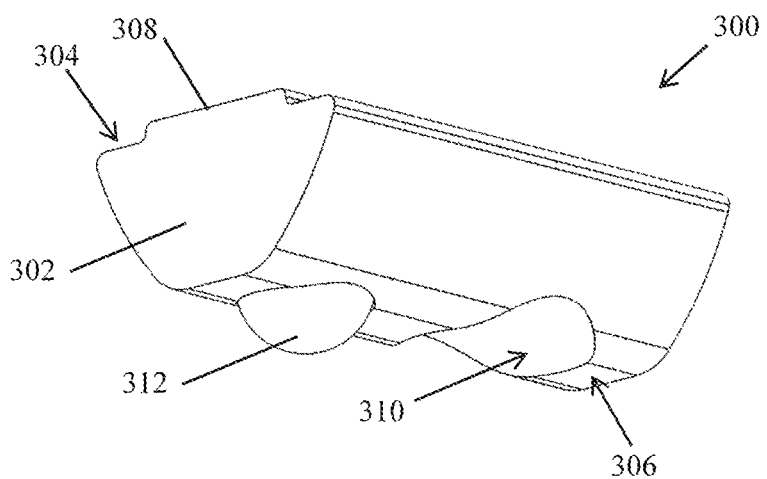
FIG. 3 is a bottom perspective view of a T-nut provided with a protrusion on a top face thereof and coplanar straight faces extending on opposite sides of the protrusion, in accordance with an embodiment.
Figure 4:
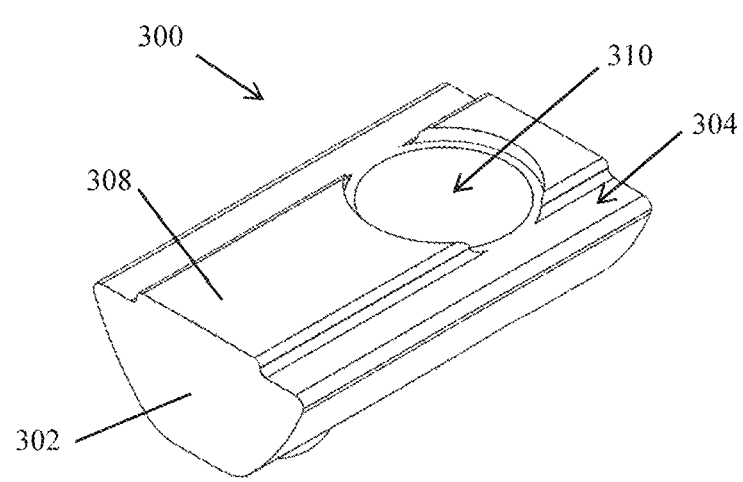
FIG. 4 is a top perspective view of the T-nut of FIG. 3.
Figure 5:
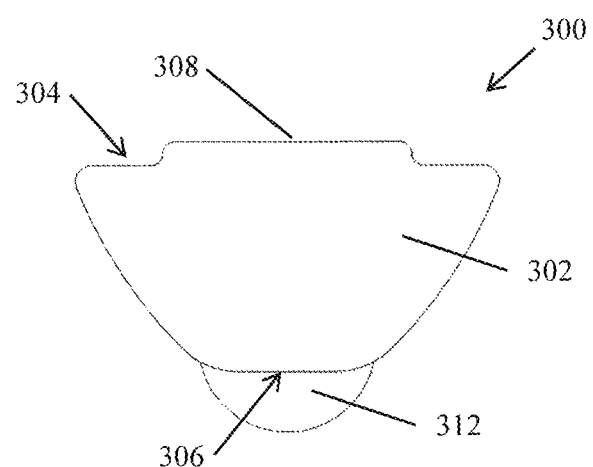
FIG. 5 is a front view of the T-nut of FIG. 3.

FIGS. 3-5 illustrate one embodiment of a T-nut 300 which may be used in connection with at least one extrusion structure 100 for securing an extrusion structure 100 to another extrusion structure 100 or any other adequate structure or device. The T-nut 300 is shaped and sized so as to be inserted into a T-shaped groove of the extrusion structure 100.

The T-nut 300 comprises an elongated body 302 extending along a longitudinal axis. The cross-section of the body 302 has a substantially trapezoidal shape. In one embodiment and as illustrated in FIGS. 3-5, the body 302 may be provided with rounded corners. The body 302 extends between a first base face 304 and a second base face 306 having a width which is less than the width of the first base face 304. It should be understood that the length of the body 302 along its longitudinal axis is less than the length of the T-shaped groove in which it is to be inserted.

The T-nut 300 further comprises a protrusion 308 which projects from the first base face 304 and is centered on the first base face 304. The protrusion 308 has a substantially rectangular cross-sectional shape. In one embodiment and as illustrated in FIGS. 3-5, the protrusion 308 may be provided with rounded corners. The width of the protrusion 308 is substantially equal to the width of the gap between the two protrusions that define the T-shaped groove in which it is to be inserted so that the protrusion 308 may snuggingly fit between the two adjacent protrusions such as protrusions 150 and 164. The height of the body 302, i.e. the distance between the first and second base faces 304 and 306, is chosen to be at most equal to the distance between the central body and the internal face associated with the T-shaped groove in which the T-nut 300 is to be inserted.

The T-nut 300 further comprises an aperture 310 which extends through the protrusion 308 and the body 302. In the illustrated embodiment, the aperture 310 is centered on the first base face and the diameter of the aperture 310 is substantially equal to the width of the protrusion 308.

In one embodiment, the T-nut 300 further comprises a cavity (not shown), a resilient member (not show) and a ball 312. The ball 312 is partially inserted into the cavity and the resilient member such as a spring is also inserted in compression into the cavity so that it exerts a push force on the ball 312. The cavity is shaped and sized so that the ball 312 partially projects from the cavity.

The ball 312 is movable between a retracted position and an extended position. When in the retracted position, the whole ball 312 may be positioned within the cavity so that no part of the ball 312 projects from the cavity. Alternatively, a portion of the ball 312 may still projects from the cavity when in the retracted position but the portion of the ball 312 which projects from the cavity is minimal. The ball 312 is brought into its retracted position by exerting a force on the ball towards the body 302. When in the extended position, the portion of the ball 312 which projects from the cavity is minimal.

In an embodiment in which the T-nut 300 comprises a ball 312, the height of the body 302 is chosen to be less than the distance between the central body 102 and an internal face so that when the T-nut is inserted into a T-shaped groove, the ball 312 abuts against the central body while the second base face 306 is not in physical contact with the central body 102.

In one embodiment and as known in the art, the ball, the cavity and the resilient member may be omitted. In this case, the height of the body 302 may be chosen to be substantially equal to the given distance between the central body 102 and an internal face so that when the T-nut is inserted into a T-shaped groove, the second base face 306 abuts against the central body 102 and the sections of the first base face 304 adjacent to the protrusion 308 each abut a respective internal face. Alternatively, the height of the body 302 may be chosen to be less than the given distance. In this case, the height of the protrusion 308 is chosen so as to be sufficiently great so that the protrusion 308 extends between two adjacent protrusions such as protrusions 150 and 164 when the T-nut 300 is inserted in a T-shaped groove.

Figure 6:
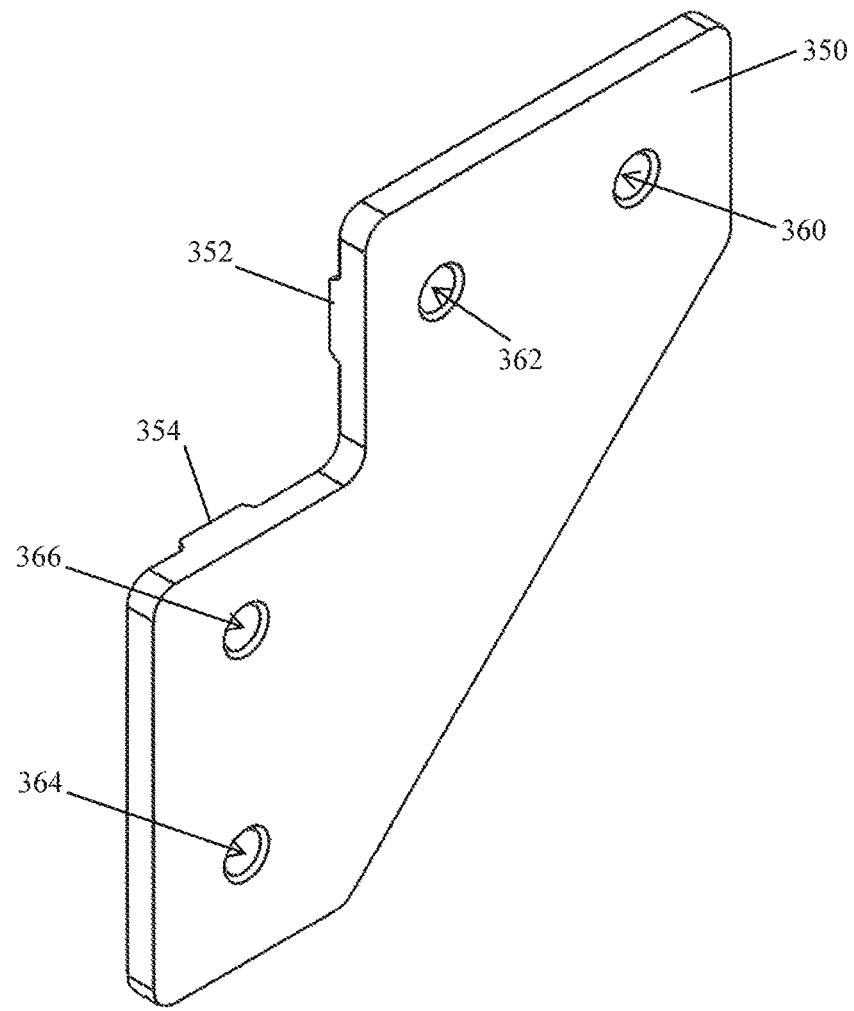
FIG. 6 is front elevation of a connecting plate provided with two protrusions extending on a back face thereof, in accordance with an embodiment.
Figure 7:
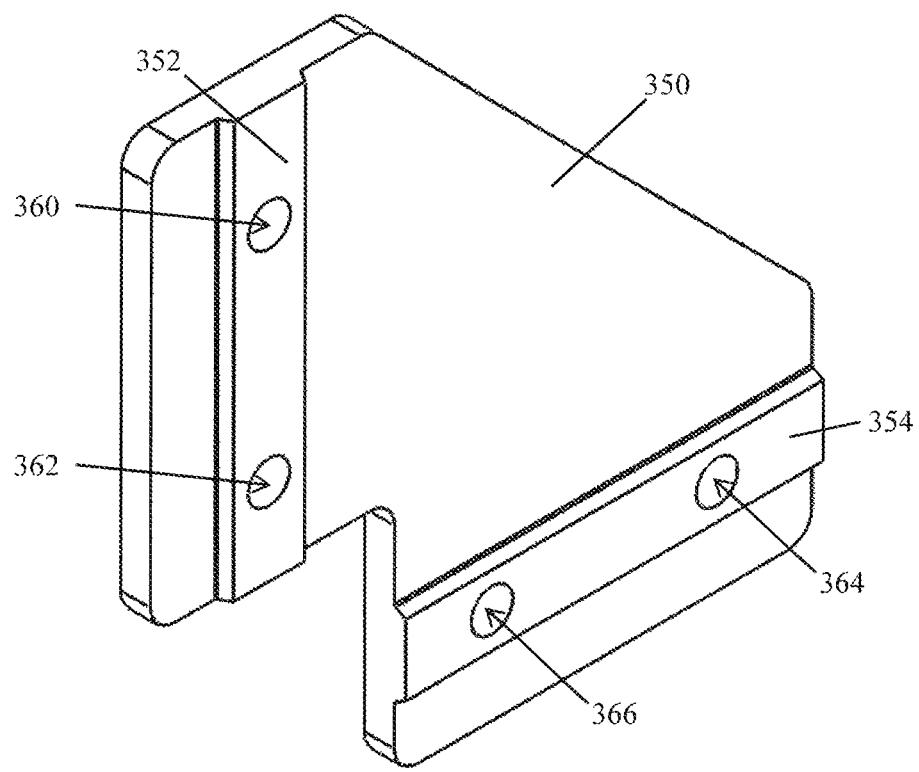
FIG. 7 is a back elevation view of the connecting plate of FIG. 6.
Figure 8:
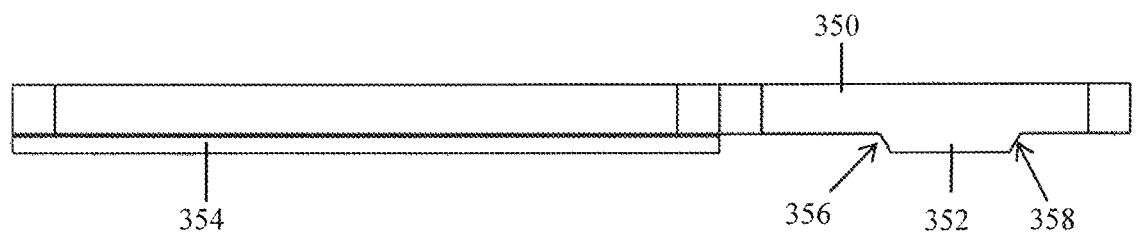
FIG. 8 is a side view of the connecting plate of FIG. 6.

FIGS. 6-8 illustrate one embodiment of a connecting plate 350 for connecting an extrusion structure 100 to another extrusion structure 100. The plate 350 comprises a first protrusion 352 having a trapezoidal shape and extending along a first longitudinal axis and a second protrusion 354 having a trapezoidal shape and extending along a second and different longitudinal axis. The first and second longitudinal axes are substantially orthogonal together. The protrusion 352, 354 are shaped and sized so as to snuggingly fit into a V-shaped groove of the extrusion structure 100 when the connecting plate 350 is positioned over the extrusion structure 100.

The width of each protrusion 352, 354 is chosen to be substantially equal to that of the V-shaped groove defined between two adjacent sloped face sections such as sections 180 and 280. Each protrusion 352, 354 extends laterally between two inclined faces 356 and 358 and the angle between the two inclined faces 356 and 358 is chosen so as to substantially correspond to the angle between two adjacent sloped face sections such as sections 180 and 280. In one embodiment, the angle between two inclined faces 356 and 358 of a same protrusion 352, 354 is equal to about 60 degrees.

The plate 350 is further provided with four apertures 360, 362, 364 and 366. The apertures 360 and 362 are positioned at different positions along the protrusion 352 and each extend through the protrusion 352 and the plate 350. The apertures 364 and 366 are positioned at different positions along the protrusion 354 and each extend through the protrusion 354 and the plate 350. In one embodiment, the diameter of the aperture 360, 362, 364, 366 is substantially equal to the diameter of the aperture 310 of a T-nut 300.

It should be understood that the number of protrusions 352 may vary as long as the connecting plate 350 is provided with at least one protrusion 352, 354. When it comprises a single protrusion 352, 354, the connecting plate 350 may be used for connecting an extrusion structure 100 to an element other then another extrusion structure 100. The number, size and/or position of the apertures 360-368 may vary as long as each protrusion 352, 354 is provided with at least one aperture 360-368.

It should also be understood that the position and/or orientation of the protrusion 352, 354 on the connecting plate 350 may vary. The length of the protrusion 352, 354 may also vary. It should also be understood that the protrusion 352 and/or 354 may be omitted. It should further be understood that the overall shape of the plate 350 may vary.

It should be understood that the connecting plate 300 is exemplary only and that any adequate connecting device may be used for securing an extrusion structure 300 to another extrusion structure 300 or to any other adequate device, structure, wall, assembly, or the like.

FIGS. 9-13 illustrates a method for securing a connecting plate 350 to an extrusion structure 100 using two T-nuts 300 and two bolts.

Figure 9:
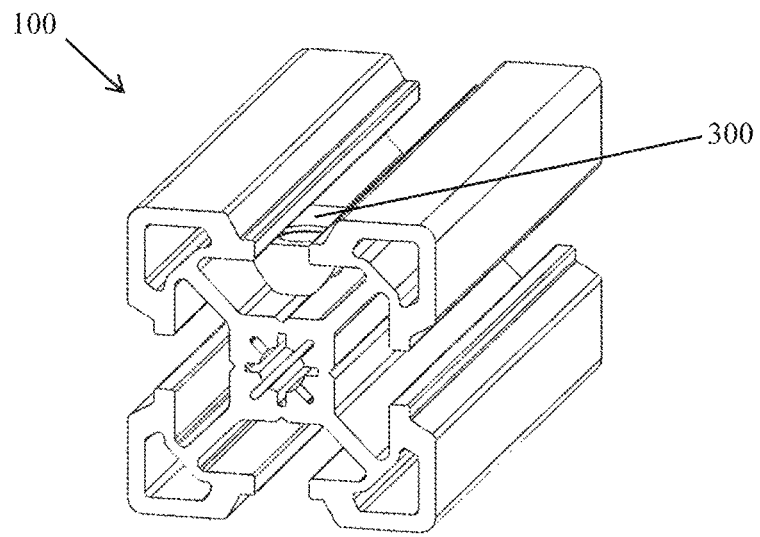
FIG. 9 is an elevation view of the extrusion structure of FIG. 1 in which the T-nut of FIG. 3 is inserted therein, in accordance with an embodiment.
Figure 10:
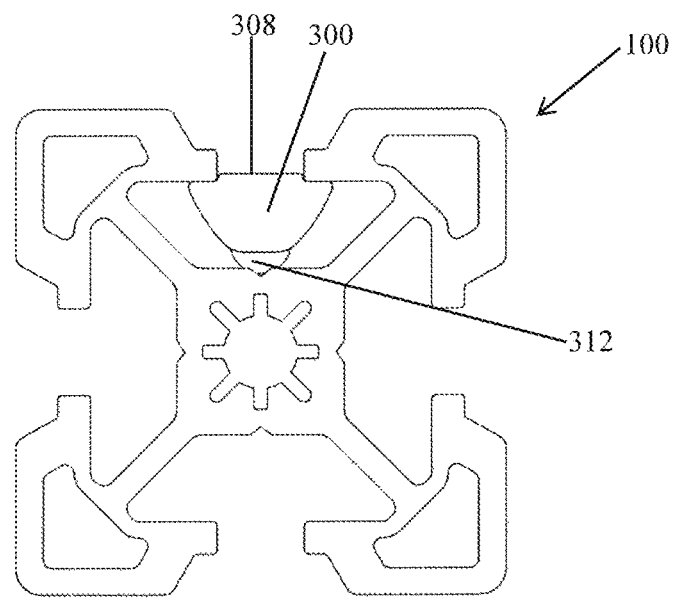
FIG. 10 is a front view of the extrusion structure of FIG. 1 in which the T-nut of FIG. 3 is inserted therein.

As illustrated in FIGS. 9 and 10, a first T-nut 300 is inserted into a given T-shaped groove of the extrusion structure 100. In order to insert the T-nut 300 into the T-shaped groove, a force is exerted on the ball 312 of the T-nut 300 so as to retract the ball 312 into the cavity and the T-nut 300 is inserted into the T-shaped groove and slid until a desired position along the length of the T-shaped groove. During the insertion of the T-nut 300 into the T-shaped groove, the protrusion 308 of the T-nut 300 is inserted in the gap present between the two adjacent protrusions associated with the T-shaped groove.

Once the T-nut is positioned within the T-shaped groove, the resilient member of the T-nut 300 exerts a force on the ball 312 which abuts against the central body 102. As a result of the force exerted on the ball 312, the sections of the first base face 304 of the T-nut 300 located on each side of the protrusion 308 each abut against a respective internal face associated with the T-shaped groove. The protrusion 308 is snuggingly inserted between the two protrusions associated with the T-shaped groove so that each lateral face of the protrusion 308 be in physical contact with a respective protrusion associated with the T-shaped groove.

A second T-nut 300 is also inserted in the same T-shaped groove and positioned at a desired position along the length of the T-shaped groove, following the above-described method for inserting the first T-nut 300.

Figure 11:
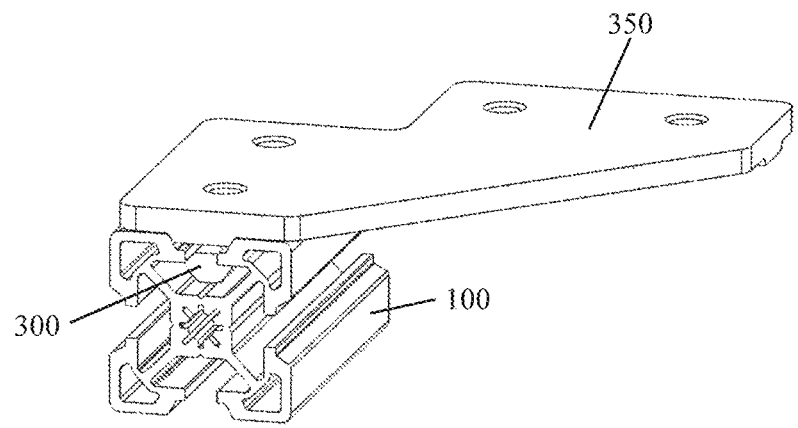
FIG. 11 is a perspective view of the extrusion structure of FIG. 1 in which the T-nut of FIG. 3 is inserted therein and the connecting plate of FIG. 6 positioned on top of the extrusion structure.
Figure 12:
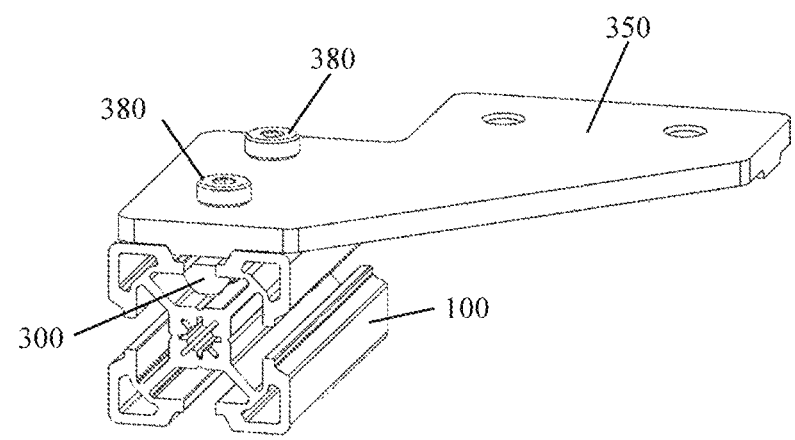
FIG. 12 is a perspective view of the extrusion structure of FIG. 1 in which the T-nut of FIG. 3 is inserted therein and the connecting plate of FIG. 6 is secured to the extrusion structure via bolts.
Figure 13:
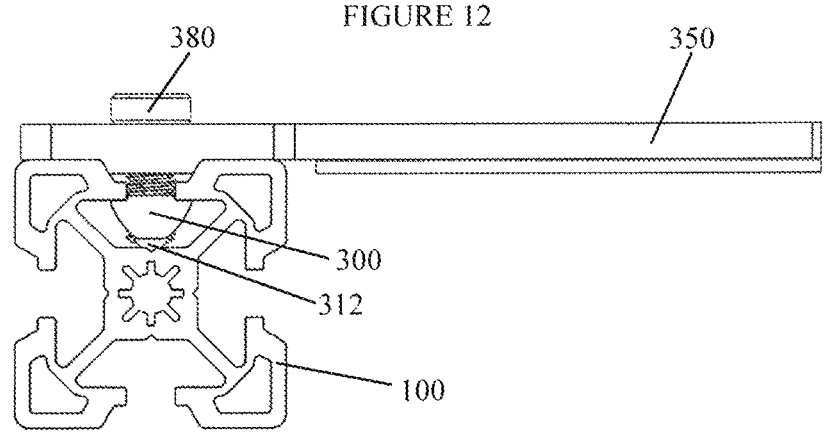
FIG. 13 is a front view of the extrusion structure of FIG. 1 in which the T-nut of FIG. 3 is inserted therein and the connecting plate of FIG. 6 is secured to the extrusion structure via bolts.

Then a connecting plate 300 is positioned on top of the extrusion structure 100 so that a protrusion 352, 354 be inserted into the V-shaped groove associated with the T-shaped groove, as illustrated in FIG. 11. Once positioned, the inclined faces 356 and 358 each abut against a respective sloped face section associated with the V-shaped groove. The connecting plate 300 is slid so that the two apertures 360-368 present in the protrusion 352, 354 inserted into the V-shaped groove each face the aperture of one of the two T-nuts 300. A bolt 380 is then screwed into the hole formed by the aperture 310 and the aperture 360-368 to firmly secure the connecting plate 350 to the extrusion structure 100, as illustrated in FIGS. 12 and 13.

It should be understood that the aperture 310 present in the T-nut 300 is threaded to threadingly engage a bolt 380. In one embodiment, the aperture 360-368 may also be threaded.

Because the protrusion 308 abuts against the walls of the adjacent protrusions of the T-shaped groove, such as the adjacent protrusions 150 and 164, the T-nut may not translate along a first axis orthogonal to the longitudinal axis of the extrusion structure 100 and comprised within the plane in which the internal faces extend. Similarly, the T-nut cannot rotate about a second axis orthogonal to both the first axis and the longitudinal axis of the extrusion structure 100. The adjacent protrusions associated with the T-shaped groove along with the protrusion 308 of the T-nut 300 allow maintaining a strong moment of inertia and the stability of the assembly is increased.

Figure 14:
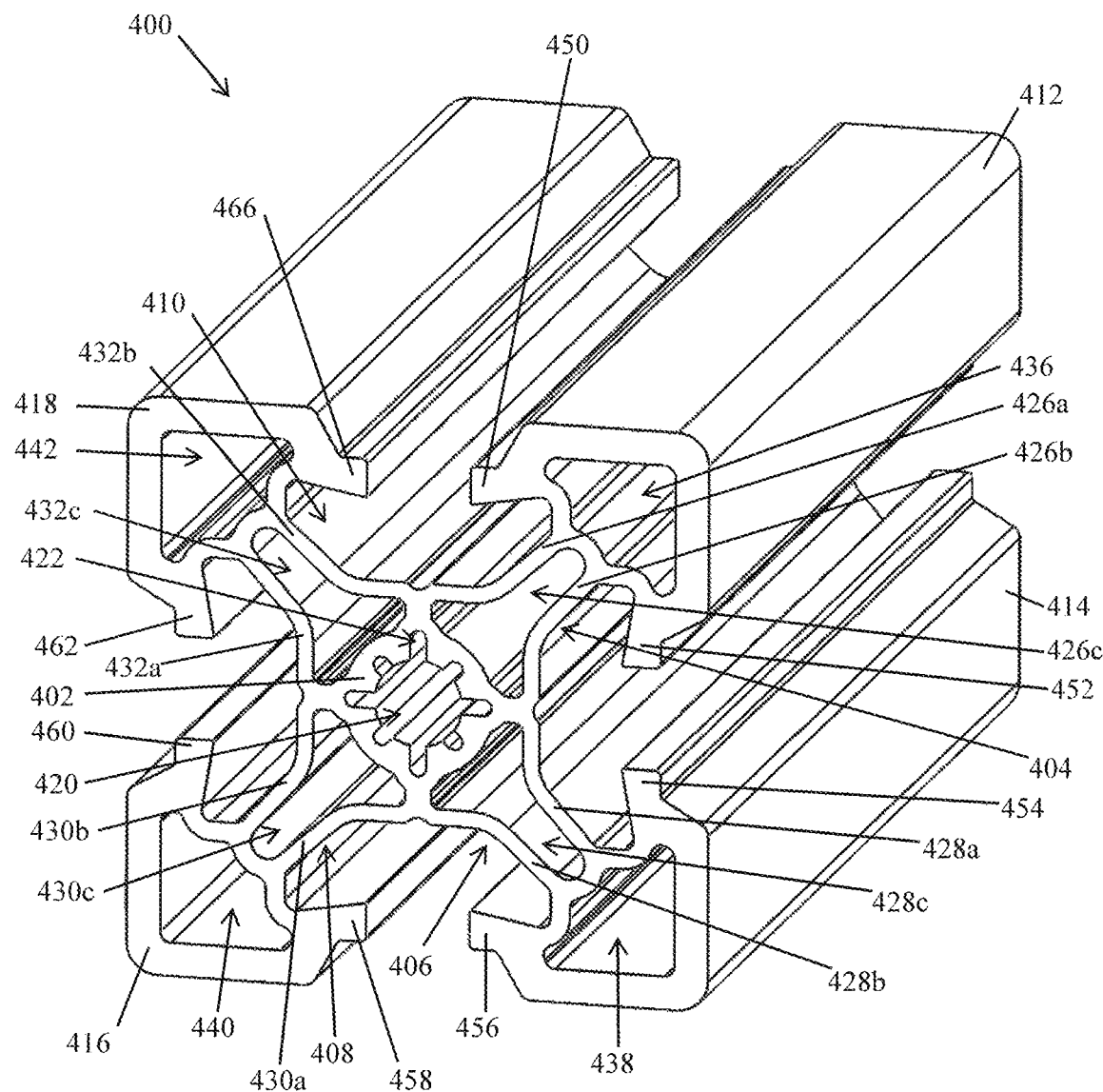
FIG. 14 is a perspective view of an extrusion structure or device comprising a central body, four arm bodies extending from the central body and four head bodies each connected to a respective arm body, adjacent head bodies facing each other comprising inwardly inclined internal faces, the central body and the head bodies comprising apertures extending along a length thereof, in accordance with an embodiment.
Figure 15:
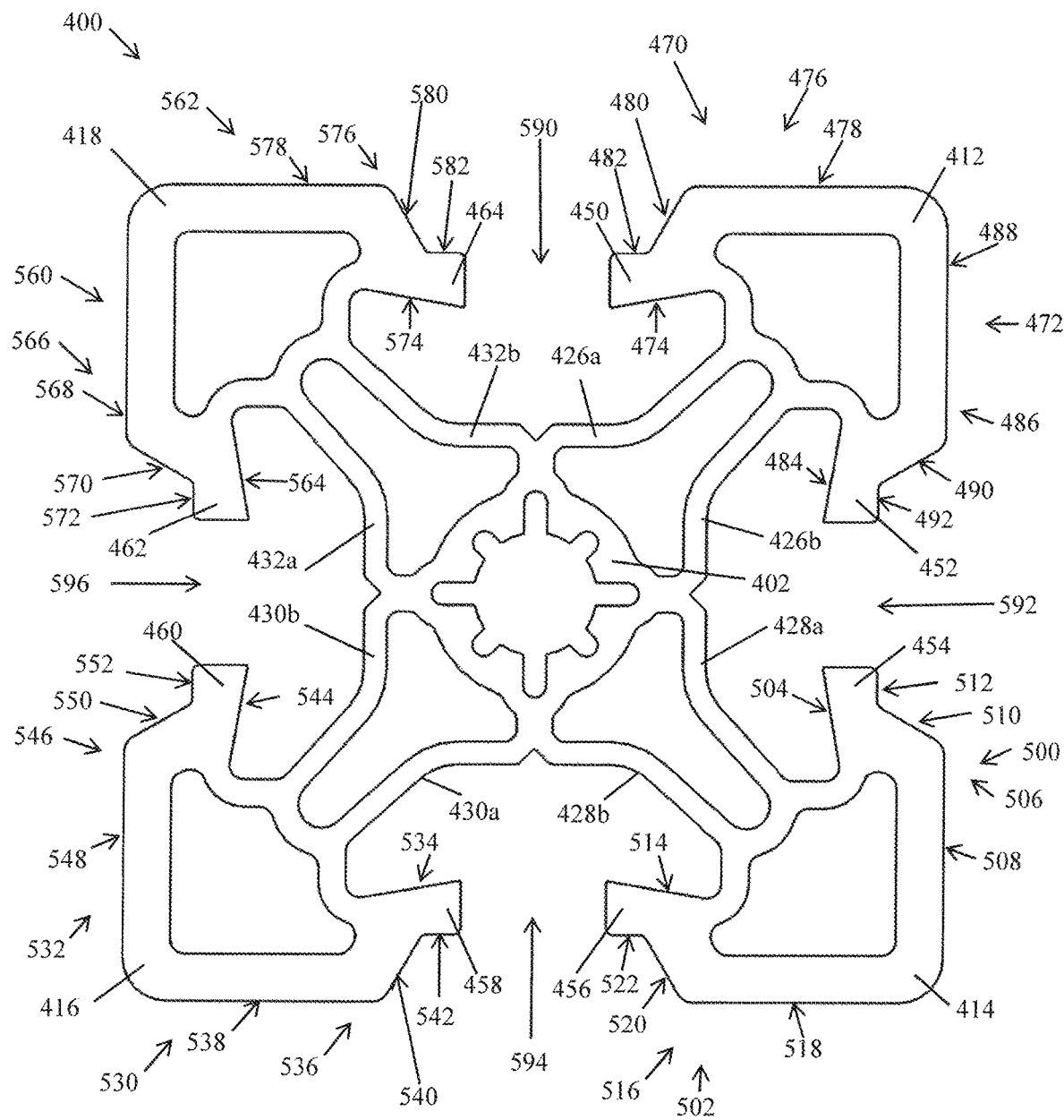
FIG. 15 is a front view of the extrusion structure of FIG. 14.

FIGS. 14 and 15 illustrate a second embodiment of an extrusion structure 400. The extrusion structure 400 extends linearly along a longitudinal axis and is provided with a substantially square cross-section.

The extrusion structure 400 comprises a central body 402, four arm bodies 404, 406, 408 and 410 which are each secured to the central body 402, and four head bodies 412, 414, 416 and 418 which are secured to the arm body 404, 406, 408, 410, respectively.

The central body 402 extends along the longitudinal axis and has a substantially cylindrical shape. The central body 402 is provided with a central cylindrical aperture 420 which is defined by an internal cylindrical wall of the central body 402 and extends along the longitudinal axis between the two ends of the central body 402. The central body 402 is further provided with eight internal grooves 422 which each extend from the internal cylindrical wall of the central body 402 and emerge within the central aperture 420. The internal grooves 422 each extend longitudinally between the two ends of the central body 402. In the illustrated embodiment, the internal grooves 422 are evenly distributed around the circumference of the internal cylindrical wall.

Each arm body 104, 106, 108, 110 comprises two arms 426a and 426b, 428a and 428b, 430a and 430b, 432a and 432b, respectively, each having a first end secured to the central body 402 and a second opposite end secured to a respective head body 412, 414, 416, 418. The two arms 426a and 426b, 428a and 428b, 430a and 430b, 432a and 432b are spaced apart so as to form an aperture 426c, 428c, 430c, 432c therebetween which extends along the length of the extrusion structure 400.

The angle between the axis of symmetry of two adjacent arm bodies 104, 106, 108, 110 is substantially equal to 90 degrees. However, the person skilled in the art will understand that other configurations may be possible.

Each head body 412, 414, 416, 418 has a substantially triangular cross-sectional shape and is provided with a respective triangular shaped aperture 436, 438, 440, 442 which extends along the longitudinal axis. Each arm 426a, 426b, 428a, 428b, 430a, 430b, 432a 432b is secured to the base of the triangle of a respective head body 412, 414, 416, 418 and the triangle of each head body 412, 414, 416, 418 is provided with two protrusions 450 and 452, 454 and 456, 458 and 460, 462 and 464, respectively. Each protrusion 450-464 extends towards an adjacent head body 412, 414, 416, 418.

Each head body 412, 414, 416, 418 may be seen as comprising two head portions secured together, each head portion being provided with a respective protrusion 450-464. For each head body 412, 414, 416, 418, the two head portions form the respective triangle provided with the two protrusions 450 and 452, 454 and 456, 458 and 460, 462 and 464, respectively. Each head portion of a given head body 412, 414, 416, 418 has the shape of a half triangle provided with a protrusion 450-464 and extends towards an adjacent head portion of an adjacent head body 412, 414, 416, 418.

The head body 412 comprises a first head portion 470 provided with the protrusion 450 and a second head portion 472 provided with the protrusion 452. The first head portion 470 comprises an inclined internal face 474 that faces the internal body 402 and the arm 426a and an external face 476 that is opposite to the internal face 474. The external face 476 comprises three sections: a planar face section 478, a sloped or inclined face section 480 and a protrusion face section 482 which belongs to the protrusion 450. The slopped face section 480 is inclined inwardly towards the central body 402, i.e. the distance between the planar face section 478 and the slopped face section 480 increases from the planar face section 478 towards the protrusion face section 482.

The second head portion 472 comprises an inclined internal face 484 that faces the internal body 402 and the arm 426b and an external face 486 that is opposite to the internal face 484. The external face 486 comprises three sections: a planar face section 488, a sloped or inclined face section 490 and a protrusion face section 492 which belongs to the protrusion 452. The slopped face section 490 is inclined inwardly towards the central body 402, i.e. the distance between the planar face section 488 and the slopped face section 490 increases from the planar face section 488 towards the protrusion face section 492.

The head body 414 comprises a first head portion 500 provided with the protrusion 454 and a second head portion 502 provided with the protrusion 456. The first head portion 500 comprises an inclined internal face 504 that faces the internal body 402 and the arm 428a, and an external face 506 that is opposite to the internal face 504. The external face 506 comprises three sections: a planar face section 508, a sloped or inclined face section 510 and a protrusion face section 512 which belongs to the protrusion 454. The slopped face section 510 is inclined inwardly towards the central body 402, i.e. the distance between the planar face section 508 and the slopped face section 510 increases from the planar face section 508 towards the protrusion face section 512.

The second head portion 502 comprises a straight internal face 514 that faces the internal body 402 and the arm 428b and an external face 516 that is opposite to the internal face 514. The external face 516 comprises three sections: a planar face section 518, a sloped or inclined face section 520 and a protrusion face section 522 which belongs to the protrusion 456. The slopped face section 520 is inclined inwardly towards the central body 402, i.e. the distance between the planar face section 518 and the slopped face section 520 increases from the planar face section 518 towards the protrusion face section 522.

The head body 416 comprises a first head portion 530 provided with the protrusion 458 and a second head portion 532 provided with the protrusion 460. The first head portion 530 comprises an inclined internal face 534 that faces the internal body 402 and the arm 430a, and an external face 536 that is opposite to the internal face 534. The external face 536 comprises three sections: a planar face section 538, a sloped or inclined face section 540 and a protrusion face section 542 which belongs to the protrusion 458. The slopped face section 540 is inclined inwardly towards the central body 402, i.e. the distance between the planar face section 538 and the slopped face section 540 increases from the planar face section 538 towards the protrusion face section 542.

The head portion 532 comprises an inclined internal face 544 that faces the internal body 402 and the arm 430b and an external face 546 that is opposite to the internal face 544. The external face 546 comprises three sections: a planar face section 548, a sloped or inclined face section 550 and a protrusion face section 552 which belongs to the protrusion 460. The slopped face section 550 is inclined inwardly towards the central body 402, i.e. the distance between the planar face section 548 and the slopped face section 550 increases from the planar face section 548 towards the protrusion face section 552.

The head body 418 comprises a first head portion 560 provided with the protrusion 462 and a second head portion 562 provided with the protrusion 464. The first head portion 560 comprises a straight internal face 564 that faces the internal body 402 and the arm 432a, and an external face 566 that is opposite to the internal face 564. The external face 566 comprises three sections: a planar face section 568, a sloped or inclined face section 570 and a protrusion face section 572 which belongs to the protrusion 462. The slopped face section 570 is inclined inwardly towards the central body 402, i.e. the distance between the planar face section 568 and the slopped face section 570 increases from the planar face section 568 towards the protrusion face section 572.

The second head portion 562 comprises an inclined internal face 574 that faces the internal body 402 and the arm 432b and an external face 576 that is opposite to the internal face 574. The external face 576 comprises three sections: a planar face section 578, a sloped or inclined face section 580 and a protrusion face section 582 which belongs to the protrusion 464. The slopped face section 580 is inclined inwardly towards the central body 402, i.e. the distance between the planar face section 578 and the slopped face section 580 increases from the planar face section 578 towards the protrusion face section 582.

In the illustrated embodiment, the internal faces are inwardly inclined, i.e. the distance between an internal face and the planar face section of the same head portion increases towards an adjacent but separate head portion. For example, the internal face 474 is inwardly inclined, i.e. the distance between the internal face 474 and the plane in which the internal face 474 is comprised increases in a direction from the junction of the arm 426a and the head body 412 towards the gap between the protrusions 450 and 464. In one embodiment, the angle between an internal face and the planar face section of a same head portion is comprised between about 3 degrees and about 7 degrees.

The planar face sections of the external faces of separate but adjacent head portions are coplanar. For example, the planar face section 478 of the head portion 470 of the head body 412 and the planar face section 578 of the head portion 562 of the head body 418 are coplanar. Similarly, the planar face section 488 and the planar face section 508 are coplanar, the planar face section 518 and the planar face section 538 are coplanar, and the planar face section 548 and the planar face section 568 are coplanar.

Furthermore, the planar face sections of a same head body are substantially orthogonal to one another. For example, the planar face sections 478 and 488 of the head body 412 are substantially orthogonal to one another. The planar face sections 508 and 518 of the head body 414 are substantially orthogonal to one another. The planar face sections 538 and 548 of the head body 416 are substantially orthogonal to one another. The planar face sections 568 and 578 of the head body 418 are substantially orthogonal to one another.

In the illustrated embodiment, two adjacent protrusions are spaced by a gap having a given width. The space defined between the central body, the internal faces and the protrusions of two adjacent head bodies and the two arms to which the two adjacent head bodies are secured define an arrow-shaped groove. As described below, each arrow-shaped groove is adapted to receive therein a T-nut for assembling two extrusion structures together for example.

For example, a first gap is present between the protrusions 450 and 464 and an arrow-shaped groove 590 is formed by the space between the central body 402, the protrusions 450 and 464 and the internal faces 474 and 474. A second gap is also present between the protrusions 452 and 454 and an arrow-shaped groove 592 is formed by the space between the central body 402, the protrusions 452 and 454 and the internal faces 484 and 504. A third gap is further present between the protrusions 456 and 458 and an arrow-shaped groove 594 is formed by the space between the central body 402, the protrusions 456 and 458 and the internal faces 514 and 534. Finally, a fourth gap is further present between the protrusions 460 and 462 and a T-shaped groove 596 is formed by the space between the central body 402, the protrusions 460 and 462 and the internal faces 544 and 564.

The space extending between two adjacent sloped face sections and between two protrusion face sections define a V-shaped groove which is adapted to receive therein a protrusion of a connecting plate as described below. In the illustrated embodiment, the angle between two adjacent sloped face sections 480 and 580, 190 and 510, 520 and 540, and 550 and 570 is substantially equal to about 60 degrees. However, the person skilled in the art will understand that other angle values may be used.

It should be understood that the extrusion structure 400 may be modified as long as the extrusion structure 400 comprises a central body, at least two adjacent arm bodies and at least two adjacent head portions each supported by a respective arm body and spaced apart by a gap and as long as the two head portions are each provided with an inclined internal wall defining at least one arrow-shaped groove along with the central body, the two adjacent arm and the two adjacent head portions.

For example, an extrusion structure may only comprise a central body, two spaced apart arm bodies projecting from the central body and a two head bodies secured to a respective head body and each head body comprises a single head portion so that the two head portion face each other and are spaced apart by a gap. Each head portion is provided with an inclined internal face that faces the central body and an opposite external face. In this case, the extrusion structure comprises a single arrow-shaped groove and a single V-shaped groove.

It should be understood that the shape, number, dimensions and/or position of the aperture 420, 436, 438, 440 and/or 442 and/or the grooves 422 and/or 424 may vary. Alternatively, the aperture 420, 436, 438, 440 and/or 442 and/or the grooves 422 and/or 424 may be omitted. It should also be understood that additional aperture(s) and/or additional groove(s) may be present on the central body, the arm bodies and/or the head bodies.

Figure 16:
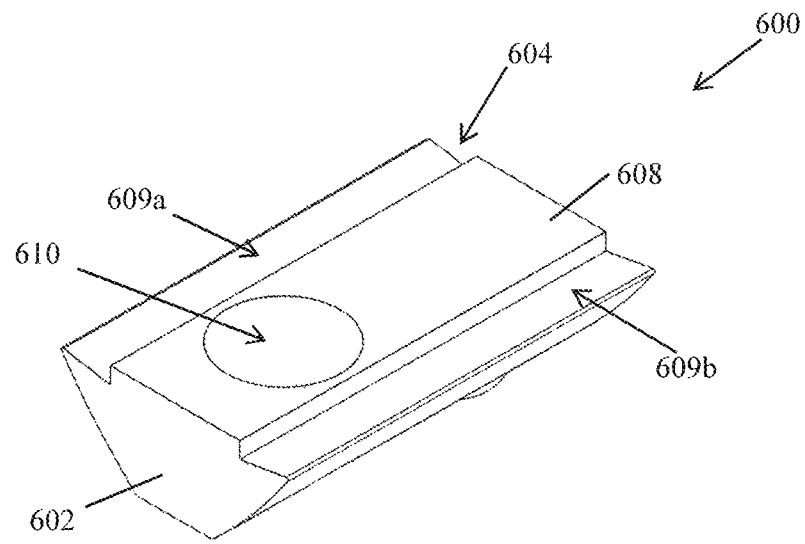
FIG. 16 is a top perspective view of a T-nut provided with a protrusion on a top face thereof and inclined faces extending on opposite sides of the protrusion, in accordance with an embodiment.
Figure 17:
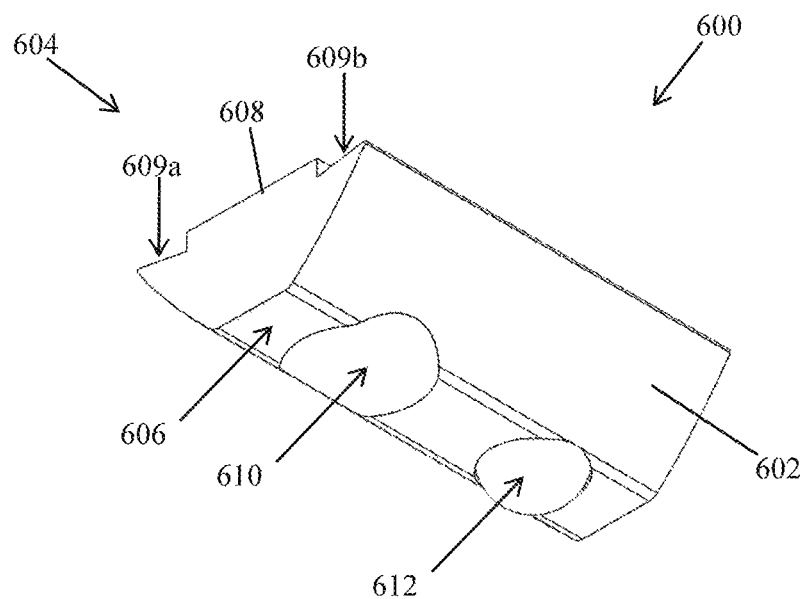
FIG. 17 is a bottom perspective view of the T-nut of FIG. 3.
Figure 18:
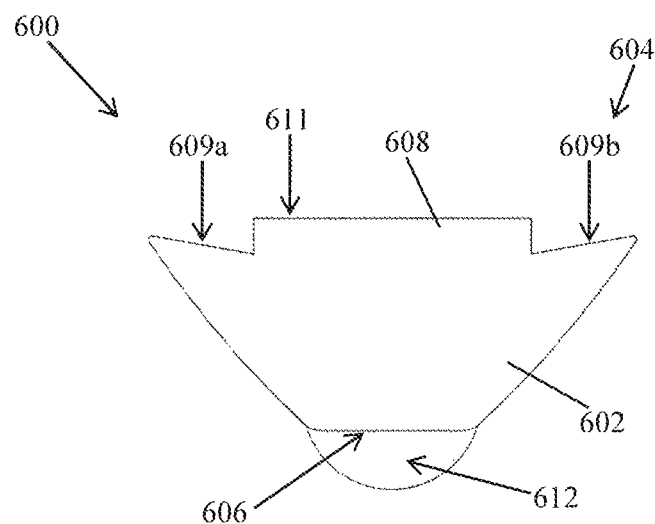
FIG. 18 is a front view of the T-nut of FIG. 3.

FIGS. 16-18 illustrate one embodiment of a T-nut 300 which may be used in connection with at least one extrusion structure 400 for securing an extrusion structure 400 to another extrusion structure 400 or any other adequate structure or device. The T-nut 600 is shaped and sized so as to be inserted into an arrow-shaped groove of the extrusion structure 400.

The T-nut 600 comprises an elongated body 602 extending along a longitudinal axis. The cross-section of the body 602 has a substantially arrow shape. The body 602 extends between a first base face 604 and a second base face 606 having a width which is less than the width of the first base face 604. It should be understood that the length of the body 602 along its longitudinal axis is less than the length of the arrow-shaped groove in which it is to be inserted.

The T-nut 600 further comprises a protrusion 608 which projects from the first base face 604 and is centered on the first base face 604. The protrusion 608 has a rectangular cross-sectional shape. The width of the protrusion 608 is substantially equal to the width of the gap between the two protrusions that define the arrow-shaped groove in which it is to be inserted so that the protrusion 608 may snuggingly fit between the two adjacent protrusions such as protrusions 450 and 464.

The first base face 604 comprises a first inclined face section 609a and a second inclined face section 609b which are located on opposite sides of the protrusion 608. The distance between each inclined face section 609a, 609b and the second base face 606 increased in a direction from the protrusion 608 towards a respective lateral end of the body 602. Since the second base face 606 and the top face of the 611 of the protrusion 608 are parallel, the distance between each inclined face section 609a, 609b and the top face 611 decreases in the direction from the protrusion 608 towards a respective lateral end of the body 602.

The T-nut 600 further comprises an aperture 610 which extends through the protrusion 608 and the body 602. In the illustrated embodiment, the aperture 610 is centered on the protrusion 608 and the diameter of the aperture 610 is less than the width of the protrusion 608.

In one embodiment, the T-nut 600 further comprises a cavity (not shown), a resilient member (not show) and a ball 612. The ball 612 is partially inserted into the cavity and the resilient member such as a spring is also inserted in compression into the cavity so that it exerts a push force on the ball 612. The cavity is shaped and sized so that the ball 612 partially projects from the cavity.

The ball 612 is movable between a retracted position and an extended position. When in the retracted position, the whole ball 612 may be positioned within the cavity so that no part of the ball 612 projects from the cavity. Alternatively, a portion of the ball 612 may still projects from the cavity when in the retracted position but the portion of the ball 612 which projects from the cavity is minimal. The ball 612 is brought into its retracted position by exerting a force on the ball towards the body 602. When the ball 312 is in the extended position, the portion of the ball 612 which projects from the cavity is minimal.

In an embodiment in which the T-nut 600 comprises a ball 612, the height of the body 302 is chosen to be less than the distance between the central body 602 and an internal face so that when the T-nut is inserted into an arrow-shaped groove, the ball 612 abuts against the central body 402 while the second base face 606 is not in physical contact with the central body 602.

In one embodiment, the ball, the cavity and the resilient member may be omitted. In this case, the height of the body 602 may be chosen to be substantially equal to the given distance between the central body 602 and an internal face so that when the T-nut 600 is inserted into an arrow-shaped groove, the second base face 606 abuts against the central body 402 and the inclined face section 609a and 609b abuts a respective internal face. Alternatively, the height of the body 602 may be chosen to be less than the given distance. In this case, the height of the protrusion 608 is chosen so as to be sufficiently great so that the protrusion 608 extends between two adjacent protrusions such as protrusions 450 and 464 when the T-nut 600 is inserted in an arrow-shaped groove.

Figure 19:
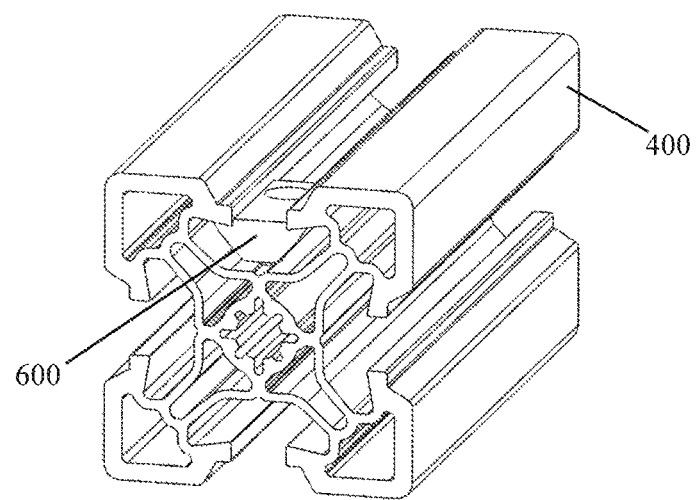
FIG. 19 is a perspective view of the extrusion structure of FIG. 14 in which the T-nut of FIG. 16 is inserted therein, in accordance with an embodiment.
Figure 20:
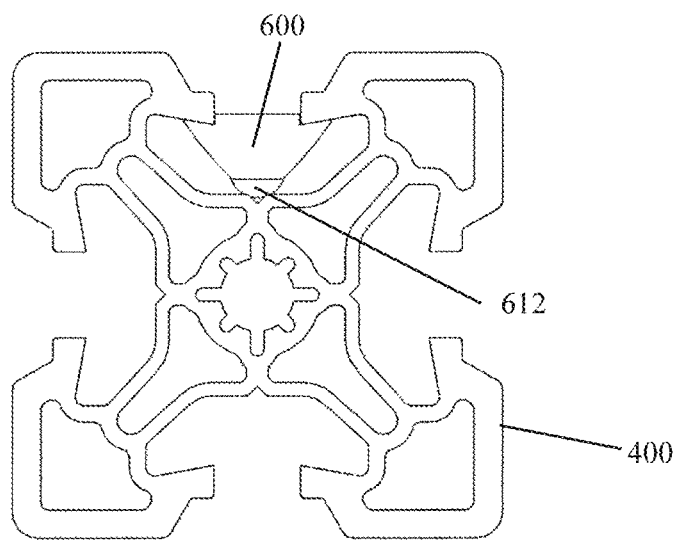
FIG. 20 is a front view of the extrusion structure of FIG. 14 in which the T-nut of FIG. 16 is inserted therein.
Figure 21:
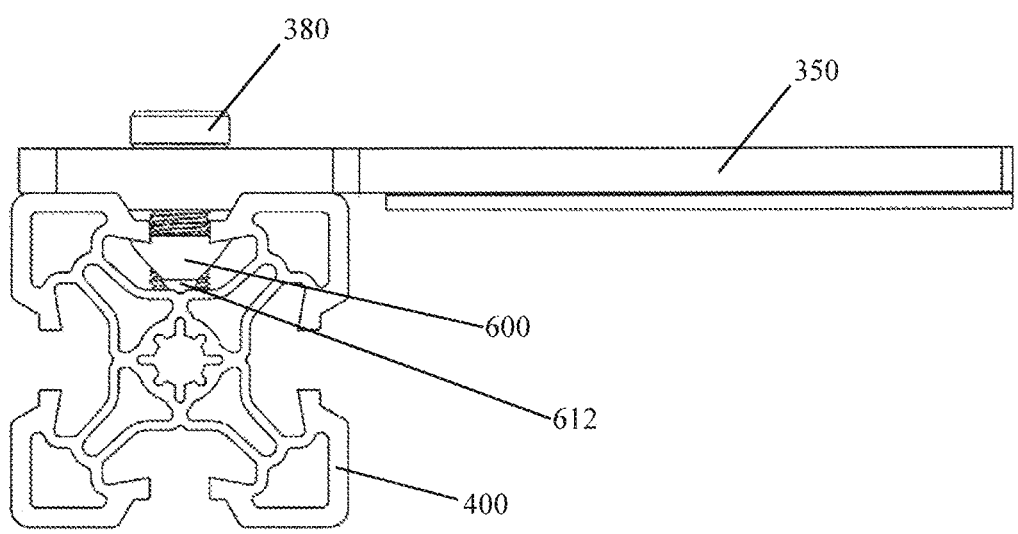
FIG. 21 is a front view of the extrusion structure of FIG. 14 in which the T-nut of FIG. 16 is inserted therein and the connecting plate of FIG. 6 is secured to the extrusion structure via bolts.

FIGS. 19-21 illustrates a method for securing a connecting plate 350 to an extrusion structure 400 using two T-nuts 600 and two bolts. The method may be used for securing two extrusion structures 400 together for example.

As illustrated in FIGS. 19 and 20, a first T-nut 600 is inserted into a given arrow-shaped groove of the extrusion structure 400. In order to insert the T-nut 600 into the arrow-shaped groove, a force is exerted on the ball 612 of the T-nut 600 so as to retract the ball 612 into the cavity and the T-nut 600 is inserted into the arrow-shaped groove and slid until a desired position along the length of the arrow-shaped groove. During the insertion of the T-nut 300 into the arrow-shaped groove, the protrusion 608 of the T-nut 600 is inserted in the gap present between the two adjacent protrusions associated with the arrow-shaped groove.

Once the T-nut is positioned within the arrow-shaped groove, the resilient member of the T-nut 600 exerts a force on the ball 612 which abuts against the central body 402. As a result of the force exerted on the ball 612, the first inclined face section 609a and a second inclined face section 609b each abut against a respective internal face associated with the arrow-shaped groove. The protrusion 608 is snuggingly inserted between the two protrusions associated with the arrow-shaped groove so that each lateral face of the protrusion 608 be in physical contact with a respective protrusion associated with the arrow-shaped groove.

A second T-nut 600 is also inserted in the same arrow-shaped groove and positioned at a desired position along the length of the T-shaped groove, following the above-described method for inserting the first T-nut 600.

Then a connecting plate 300 is positioned on top of the extrusion structure 400 so that a protrusion 352, 354 be inserted into the V-shaped groove associated with the arrow-shaped groove, as illustrated in FIG. 11. Once positioned, the inclined faces 356 and 358 each abut against a respective sloped face section associated with the arrow-shaped groove. The connecting plate 300 is slid so that the two apertures 360-368 present in the protrusion 352, 354 inserted into the V-shaped groove each face the aperture of a respective T-nut 600. A bolt 380 is then screwed into the hole formed by the aperture 610 and the aperture 360-368 to firmly secure the connecting plate 350 to the extrusion structure 400, as illustrated in FIG. 21.

It should be understood that the aperture 610 present in the T-nut 600 is threaded to threadingly engage a bolt 380.

Because the protrusion 608 abuts against the walls of the adjacent protrusions of the arrow-shaped groove, such as the adjacent protrusions 550 and 564, the T-nut 600 may not translate along a first axis orthogonal to the longitudinal axis of the extrusion structure 400 and comprised within the plane in which the internal faces extend. Similarly, the T-nut 600 cannot rotate about a second axis orthogonal to both the first axis and the longitudinal axis of the extrusion structure 600. The adjacent protrusions associated with the arrow-shaped groove allow maintaining a strong moment of inertia.

The inwardly inclined internal faces of the arrow-shaped groove and the corresponding inclined face sections 609a and 609b allows reducing the risk for the T-nut 600 to be pulled-out of the arrow-shaped groove when submitted to heavy-load and screw torque as the "arrow-shape" interface creates a normal force against the inwardly inclined internal faces. As a result, T-nuts 600 and bolts 380 can be tightened at much greater torque, thereby reducing slippage of the T-nuts 600 when submitted to heavy-load.

Furthermore, T-nuts 600 have less tendency to move sideways (i.e., from their expected position) when being tighten, as the "arrow-shape" interface between the inwardly inclined internal faces and the inclined face sections 609a and 609b help re-align the T-nuts 600 in its expected position.

Figure 22:
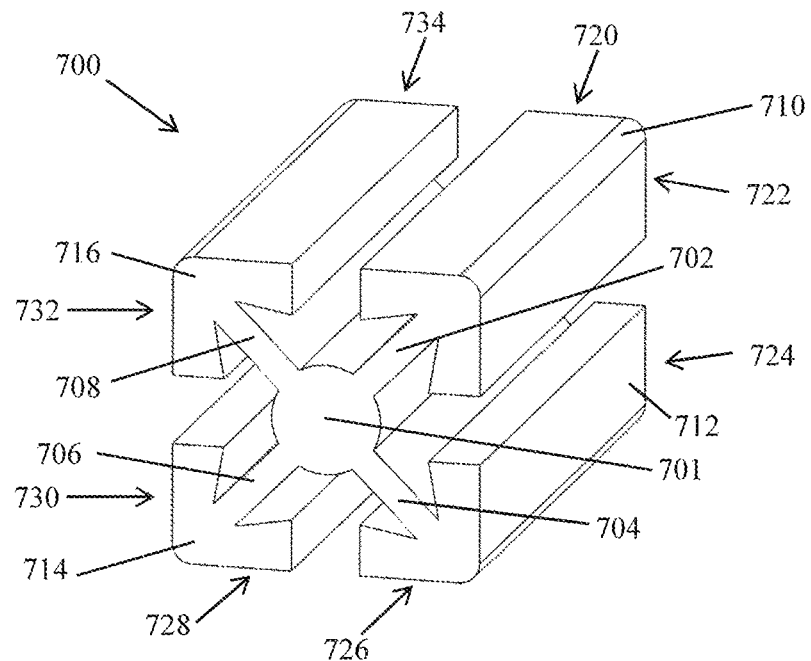
FIG. 22 is a perspective view of an extrusion structure or device comprising a central body, four arm bodies extending from the central body and four head bodies each connected to a respective arm body, adjacent head bodies facing each other comprising inwardly inclined internal faces, the central body and the head bodies comprising no apertures extending along a length thereof, in accordance with an embodiment.
Figure 23:
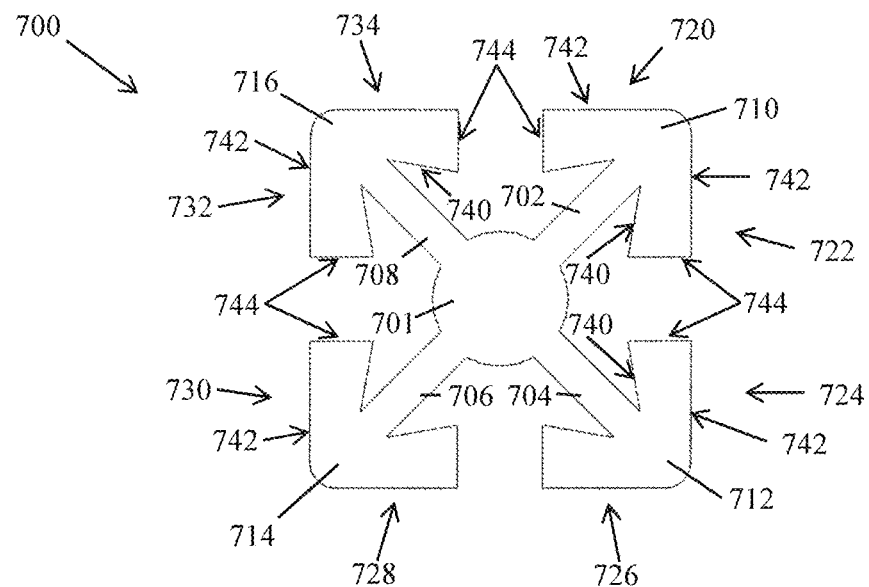
FIG. 23 is a front view of the extrusion structure of FIG. 22.

As described above, the geometry of the extrusion structure 400 may vary. For example, FIGS. 22 and 23 illustrates one embodiment of an extrusion structure 700 which comprises a central cylindrical body 701, four arms 702, 704, 706 and 708 projecting from the central body 701 and extending along the length of the central body 701. The angle between two adjacent arms is substantially equal to 90 degrees.

The extrusion structure 700 further four head bodies 710, 712, 714 and 716. The assembly formed of an arm 702, 704, 706, 708 and a respective head body 710, 712, 714, 716 has the shape of an arrow. Each head body 710, 712, 714, 716 comprises two head portions 720 and 722, 724 and 726, 728 and 730, 732 and 734, respectively, which each project from their respective arm 702, 704, 706, 708. Two adjacent head portions are spaced apart by a respective gap.

Each head portion 720, 722, 724, 726, 728, 730, 732, 734 comprises an internal inclined face 740 which faces the central body 701, an external straight face 742 which faces the internal inclined face 740 and a front face 744 which connects the internal and external faces 740 and 742 together and faces a gap. The angle between the internal inclined face 740 and the external straight face 742 is comprised between about 3 degrees and about 7 degrees.

In one embodiment, the extrusion structure 100, 400, 700 is made of aluminum. In another embodiment, the extrusion structure 100, 400, 700 is made of aluminum is made of plastic.

The nut 300, 600 and/or the plate 350 may be made of aluminum, plastic or another adequate material such as metal, steel, etc.

The embodiments of the invention described above are intended to be exemplary only. The scope of the invention is therefore intended to be limited solely by the scope of the appended claims.

We claim:

1. An extrusion structure comprising:
   a central body extending along a longitudinal axis;
   a first arm body secured to the central body and extending along the longitudinal axis;
   a second arm body secured to the central body and extending along the longitudinal axis;
   a first head body secured to the first arm body and extending along the longitudinal axis; and
   a second head body secured to the second arm body along the longitudinal axis;
   the first and second head bodies projecting one towards the other and being spaced apart by a gap, the first head body comprising a first internal face facing the central body and a first external face opposite to the first internal face, the second head body comprising a second internal face facing the central body and a second external face opposite to the second internal face, the first external face comprising a first planar face section extending towards the second head body, a first slopping face section extending from the first planar face section towards the central body and a first protruding face section extending from the first slopping face section, the second external face comprising a second planar face section extending towards the first head body, a second slopping face section extending from the second planar face section towards the central body and a second protruding face section extending from the first slopping face section.

2. The extrusion structure of claim 1, wherein the first and second planar face sections are coplanar.

3. The extrusion structure of claim 1, wherein the first and second internal faces are coplanar.

4. The extrusion structure of claim 3, wherein the first and second internal faces are parallel to the first and second external faces.

5. The extrusion structure of claim 1, wherein the first and second internal faces are each slopped, a distance between the first internal face and a first external plane in which the first planar face section extends decreasing from the first arm body towards the second arm body and a distance between the second internal face and a second external plane in which the second planar face section extends decreasing from the second arm body towards the first arm body.

6. The extrusion structure of claim 5, wherein a first angle between the first internal face and the first external plane is between about 3 degrees and about 7 degrees and wherein a second angle between the second internal face and the second external plane is between about 3 degrees and about 7 degrees.

7. The extrusion structure of claim 1, wherein a V-groove angle defined between the first and second slopping face sections is between about 30 degrees and about 85 degrees.

8. The extrusion structure of claim 1, wherein the first and second protruding face sections are coplanar.

9. The extrusion structure of claim 8, wherein the first and second protruding face sections are parallel to the first and second planar face sections.

10. The extrusion structure of claim 1, wherein a distance between the first and second arm bodies increases from the central body towards the first and second head bodies.

11. The extrusion structure of claim 1, wherein the central body comprises an outer face facing the gap, the outer face comprising a recess extending along the longitudinal axis and being centered on the gap.

12. The extrusion structure of claim 1, wherein the central body comprises a central aperture extending along the longitudinal axis and the first and second head bodies each comprise a hole extending along the longitudinal axis.

13. The extrusion structure of claim 1, wherein the central body, the first arm body, the second arm body, the first head body and the second head body are integral and made of aluminum.

14. An extrusion structure comprising:
a central body extending along a longitudinal axis between a first end and a second end;
a first arm body secured to the central body and extending along the longitudinal axis;
a second arm body secured to the central body and extending along the longitudinal axis;
a first head body secured to the first arm body and extending along the longitudinal axis; and
a second head body secured to the second arm body along the longitudinal axis,
the first and second head bodies projecting one towards the other and being spaced apart by a gap, the first head body comprising a first internal face facing the central body and a first external face opposite to the first internal face, the second head body comprising a second internal face facing the central body and a second external face opposite to the second internal face, the first external face comprising at least a first planar face section, the second external face comprising at least a second planar face section, the first and second internal faces each being slopped, a distance between the first internal face and a first external plane in which the first planar face section extends decreasing from the first arm body towards the second arm body, and a distance between the second internal face and a second external plane in which the second planar face section extends decreasing from the second arm body towards the first arm body.

15. The extrusion structure of claim 14, wherein the first and second planar face sections are coplanar.

16. The extrusion structure of claim 14, wherein an angle between the first internal face and the external plane is between about 3 degrees and about 7 degrees.

17. The extrusion structure of claim 14, wherein the first external face further comprises a first slopping face section extending from the first planar face section towards the central body, and the second external face further comprises a second slopping face section extending from the second planar face section towards the central body.

18. The extrusion structure of claim 17, wherein a V-groove angle defined between the first and second slopping face sections is between about 30 degrees and about 85 degrees.

19. The extrusion structure of claim 17, wherein the first external face further comprises a first protruding face section extending from the first slopping face section and the second external face further comprises a second protruding face section extending from the first slopping face section.

20. The extrusion structure of claim 19, wherein the first and second protruding face sections are coplanar.

21. The extrusion structure of claim 20, wherein the first and second protruding face sections are parallel to the first and second first and second planar face sections.

22. The extrusion structure of claim 14, wherein a distance between the first and second arm bodies increases from the central body towards the first and second head bodies.

23. The extrusion structure of claim 14, wherein the central body comprises an outer face facing the gap, the outer face comprising a recess extending along the longitudinal axis and being centered on the gap.

24. The extrusion structure of claim 14, wherein the central body comprises a central aperture extending along the longitudinal axis and the first and second head bodies each comprise a hole extending along the longitudinal axis.

25. The extrusion structure of claim 14, wherein the central body, the first arm body, the second arm body, the first head body and the second head body are integral and made of aluminum.

* * * * *